United States Patent [19]

Futami et al.

[11] Patent Number: 5,775,226
[45] Date of Patent: Jul. 7, 1998

[54] UNDERWATER AND LAND TRAVEL VEHICLE

[75] Inventors: Hiroshi Futami; Kenjiro Futami, both of Shimonoseki, Japan

[73] Assignee: Koyo Engineering Company, Ltd., Yamaguchi, Japan

[21] Appl. No.: 696,852

[22] PCT Filed: Jul. 12, 1995

[86] PCT No.: PCT/JP95/02503

§ 371 Date: Aug. 7, 1996

§ 102(e) Date: Aug. 7, 1996

[87] PCT Pub. No.: WO96/17735

PCT Pub. Date: Jun. 13, 1996

[30] Foreign Application Priority Data

Dec. 8, 1994 [JP] Japan .................. 6-304845
Dec. 8, 1994 [JP] Japan .................. 6-304846

[51] Int. Cl.⁶ .................................................. A63G 3/00
[52] U.S. Cl. ........................ 104/71; 104/23.1; 104/139; 105/348; 114/325
[58] Field of Search ........................ 104/23.1, 53, 71, 104/95, 139; 105/155, 238.1, 329.1, 348, 349; 114/323, 324, 325

[56] References Cited

U.S. PATENT DOCUMENTS

| 929,972 | 8/1909 | M'Giehan | 104/71 |
| 1,056,929 | 3/1913 | Navarro | 104/71 |
| 3,114,333 | 12/1963 | Fowler et al. | 104/71 |
| 5,215,016 | 6/1993 | Futami | 104/71 |

FOREIGN PATENT DOCUMENTS

| 447118 | 12/1912 | France | 114/325 |
| 57-74867 | 5/1982 | Japan . | |
| 61-146668 | 7/1986 | Japan . | |
| 62-130996 | 8/1987 | Japan . | |
| 4108010 | 4/1992 | Japan . | |
| 173 | of 1907 | United Kingdom | 104/71 |

Primary Examiner—S. Joseph Morano

[57] ABSTRACT

A pair of travel rails (46) each having an upper surface and a lower surface are laid to extend from on the land (44) into the water (45). Main tires (12) are rotatably disposed on opposite sides of a vehicle body (1), so that they are located between the upper and lower surfaces of the travel rails (46), and so that they abut against the lower surfaces of the travel rails (46) during traveling of the vehicle body on the land. Auxiliary tires (13) are disposed on upper portions of the main tires (12) to abut against the main tires (12). The auxiliary tires (13) are adapted to abut against the upper portions of the travel rails (46) under influence of the buoyancy of the vehicle body (1) during traveling of the vehicle body in the water. Thus, the travel vehicle body (1) can continuously travel on the land and in the water by rotatively driving the main tires (12) to move the travel vehicle body (1) along the travel rails (46).

9 Claims, 13 Drawing Sheets

UNDERWATER AND LAND TRAVEL VEHICLE

FIELD OF THE INVENTION

The present invention relates to an underwater and land travel vehicle, and particularly, to an underwater and land travel vehicle which is capable of traveling between on a land and in the water along a travel rail.

BACKGROUND ART

In general, a ship or boat with passengers or loads loaded therein is conventionally used as a vehicle cruising on the water such as sea or lake, and a ship or boat having a glassed bottom and a submarine cruising in the water are conventionally used as a vehicle capable of viewing the sight in the water by a passenger.

However, each of the above ship or boat and the above submarine suffers a problem that it is impossible to operate it in a stormy weather, resulting in a disadvantage arisen in many cases, and it is impossible to give a sightseer satisfaction. When a passenger gets on or off the ship or the submarine, the passenger need move to a pier or the like, which is extremely inconvenient, and moreover, there is another problem that the getting-on and-off is accompanied by a danger.

A further problem arisen in the above submarine is that if a trouble or the like should be produced in the water, a water pressure is applied and hence, it is impossible for the passenger to escape by himself or herself from the submarine. For this reason, there is no escape means except for the floating of the submarine itself, resulting in an extremely high dangerous condition.

Accordingly, it is an object of the present invention to provide an underwater and land travel vehicle which is capable of being reliably and safely moved from on the land into the water irrespective of the weather or the like.

It is another object of the present invention to provide an underwater and land travel vehicle, wherein even when trouble is produced in the water, the passenger can be allowed to reliably escape from the vehicle, leading to a remarkably enhanced safety.

DISCLOSURE OF THE INVENTION

To achieve the above object, according to an aspect and feature of the present invention, there is provided an underwater and land travel vehicle comprising a bilged type vehicle body formed for movement along a pair of travel rails which are laid to extend from on the land into the water and which each have an upper surface and a lower surface, wherein the vehicle further includes main tires which are located between the upper and lower surfaces of the travel rails, so that they abut against the lower surfaces of the travel rails during traveling of the vehicle on the land, and auxiliary tires each of which is disposed on an upper portion of each of the main tires to abut against the main tire, so that they abut against the upper surfaces of the travel rails under influence of the buoyancy of the vehicle body during traveling of the vehicle in the water.

With such feature of the present invention, by driving the main tires in rotation, the force of gravity is applied to the travel vehicle body on the land, thereby causing the main tires to be brought into abutment against the lower surfaces of the travel rails, so that the vehicle body is moved along the travel rails by the rotative driving of the main tires.

Then, when the vehicle body has been moved along the travel rails and submerged into the water, water is permitted to enter the inside of the vehicle body, causing the vehicle body to float under influence of the buoyancy thereof. As a result, the main tires are spaced apart from the lower surfaces of the travel rails, and the auxiliary tires abut against the upper surfaces of the travel rails. In this case, the auxiliary tires are rotated in a direction opposite from the direction of rotation of the main tires, because they are in contact with the main tires. Thus, the direction of rotation of the main tires are maintained intact, and the vehicle body is moved in the water along the upper surfaces of the travel rails by virtue of the auxiliary tires.

When the vehicle body has been moved from in the water into the air along the travel rails, the buoyancy is lost and the force of gravity is applied. This causes the vehicle body to be lowered, so that the main tires are brought into abutment against the lower surfaces of the travel rails, whereby the vehicle body is moved along the travel rails by the rotative driving of the main tires. Thus, it is possible for the vehicle body to continuously travel in the water and on the land.

According to the present invention, the travel vehicle may include a vehicle capsule placed on the vehicle body. With such arrangement, it is possible to accommodate passengers or loads within the vehicle capsule.

According to the present invention, a passenger compartment for getting-in of passengers may be defined within the vehicle capsule. Thus, it is possible for the passengers to get in the vehicle capsule.

Further, according to the present invention, a cargo compartment for loading of loads maybe defined within the vehicle capsule. Thus, it is possible for the loads to be loaded in the vehicle capsule.

According to the present invention, guide walls formed so as to be spread at their ends into an arcuate shape may be mounted at ends of the travel rails located on the land, so that they are contiguously to such ends. Thus, the vehicle body traveling on a road surface on the land is guide along inner surfaces of the guide walls by movement between the guide walls. Therefore, the vehicle body can be necessarily located between the travel rails.

According to another aspect and feature of the present invention, there is provided an emergency escaping device in an underwater and land travel vehicle comprising a vehicle body which has a travel capsule placed on an upper portion thereof and which is capable of being moved along a pair of travel rails which are laid to extend from on the land into the water, so that in case of emergency, the vehicle capsule can be separated from the vehicle body, wherein the emergency escaping device includes a capsule retaining mechanism adapted to usually retain the vehicle capsule and the travel vehicle body in an integral state and to release the retaining in case of emergency, the vehicle body and the vehicle capsule being connected to each other by a wire, and a resistance applying means disposed in the vehicle body for limiting the amount of wire drawn out.

With such features of the present invention, when any trouble is produced during traveling of the vehicle body in the water, the vehicle capsule can be separated from the vehicle body by releasing the retaining of the vehicle body and the vehicle capsule by the capsule retaining mechanism.

Further, according to the present invention, the resistance applying means may be a fluid fin, and the wire is wound around a rotary pulley which is mounted on a rotary shaft of the fluid fin.

Thus, it is possible to limit the drawing-out of the wire connecting the vehicle capsule and the vehicle body by a resistance to the rotation of the fluid fin in the water, thereby limiting the floating speed of the vehicle capsule.

BEST MODE FOR CARRYING OUT THE INVENTION

The best mode for carrying out the invention will now be described with reference to the accompanying drawings.

FIGS. 1 to 6 show an embodiment of an underwater and land travel vehicle according to the present invention. A vehicle capsule 2 is mounted on an upper portion of a vehicle body 1 which is made of a material such as FRP and acrylic resins, and a passenger compartment 3 is provided within the vehicle capsule 2 in this embodiment. An internal hutch 4 is openably and closably disposed in rear of the passenger compartment 3 for partitioning the inside and the outside of the compartment 3 in an air-tight manner. External hutches 5 and 6 are disposed at rear portions of the vehicle body 1 and the vehicle capsule 2, respectively, so that they can be opened and closed laterally in one piece about one sides thereof. A step 7 for movement of the passengers or occupants when getting-on and -off the vehicle is disposed below the vehicle body 1 and between the inside of the external hutches 5 and 6 and the internal hutch 4 of the vehicle capsule 2.

A plurality of seats 8 are disposed, for example, in two front and rear rows, within the passenger compartment 3. A window 9 having a pressure resistance and made of a transparent material such as glass is integrally mounted at an upper portion of the compartment 3. The window 9 ensures that an occupant seated on the seat 8 can view forward, upward and sideways sights from the inside.

Wing-like side covers 10 are integrally formed on upper edges of opposite sides of the vehicle body 1 to project sideways. A wing 11 is mounted to lower end edges of the external hutches 5 and 6 of the vehicle body 1 to extend sideways at a predetermined distance spaced apart from the surfaces of the external hutches 5 and 6.

Four main tires 12, 12, are disposed at front and rear locations below the side covers 10 on the opposite sides of the vehicle body 1. In this embodiment, two smaller-diameter auxiliary tires 13 are disposed on an upper portion of each of the main tires 13, so that their peripheral surfaces abut against an outer peripheral surface of the main tire. Further, guide arms 14 are mounted on the opposite sides of the vehicle body 1 between the front and rear main tires 12 to protrude sideways. A guide tire 15 is rotatably mounted at a tip end of each of the guide arms 14 in such a manner that its tip end protrudes from outer end face of the main tire 12.

Figure 1:
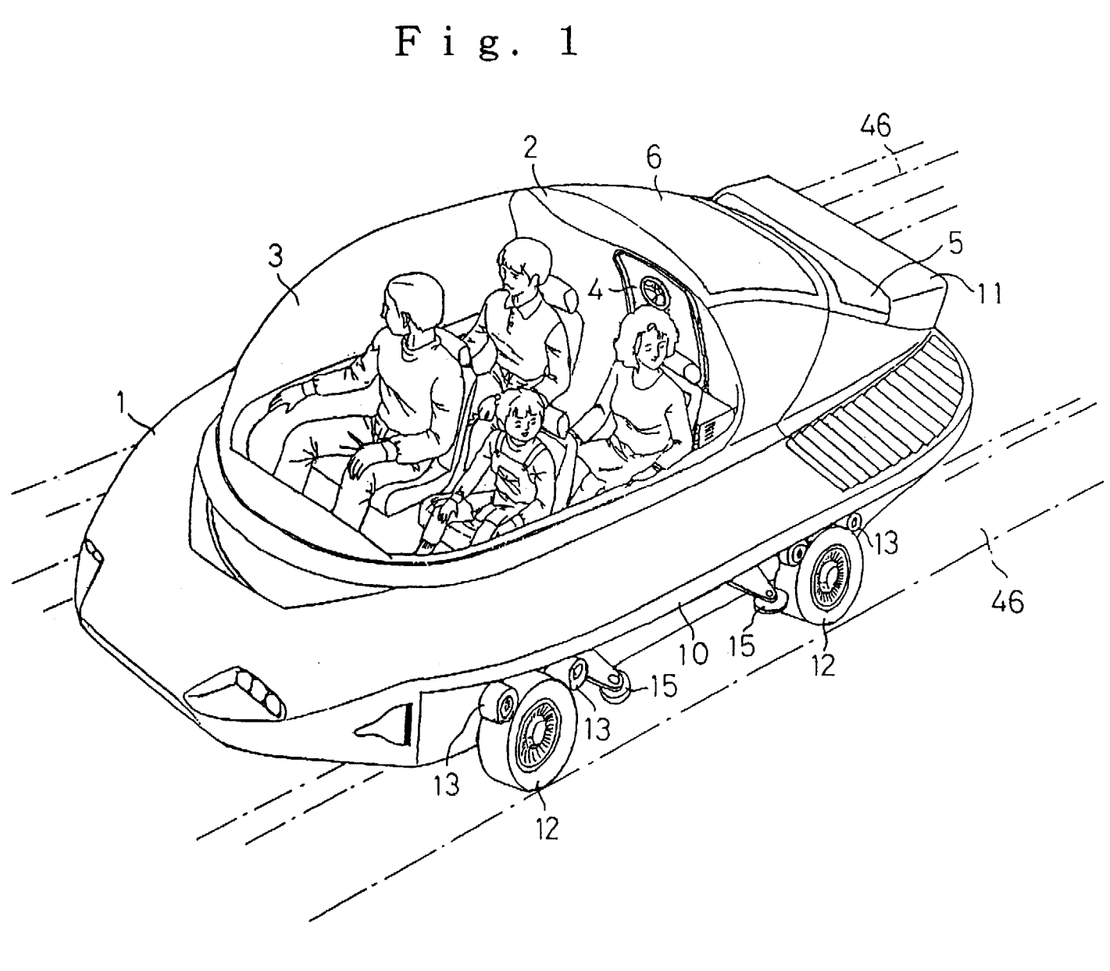
FIG. 1 is a perspective view illustrating a preferred underwater and land travel vehicle according to the present invention.
Figure 2:
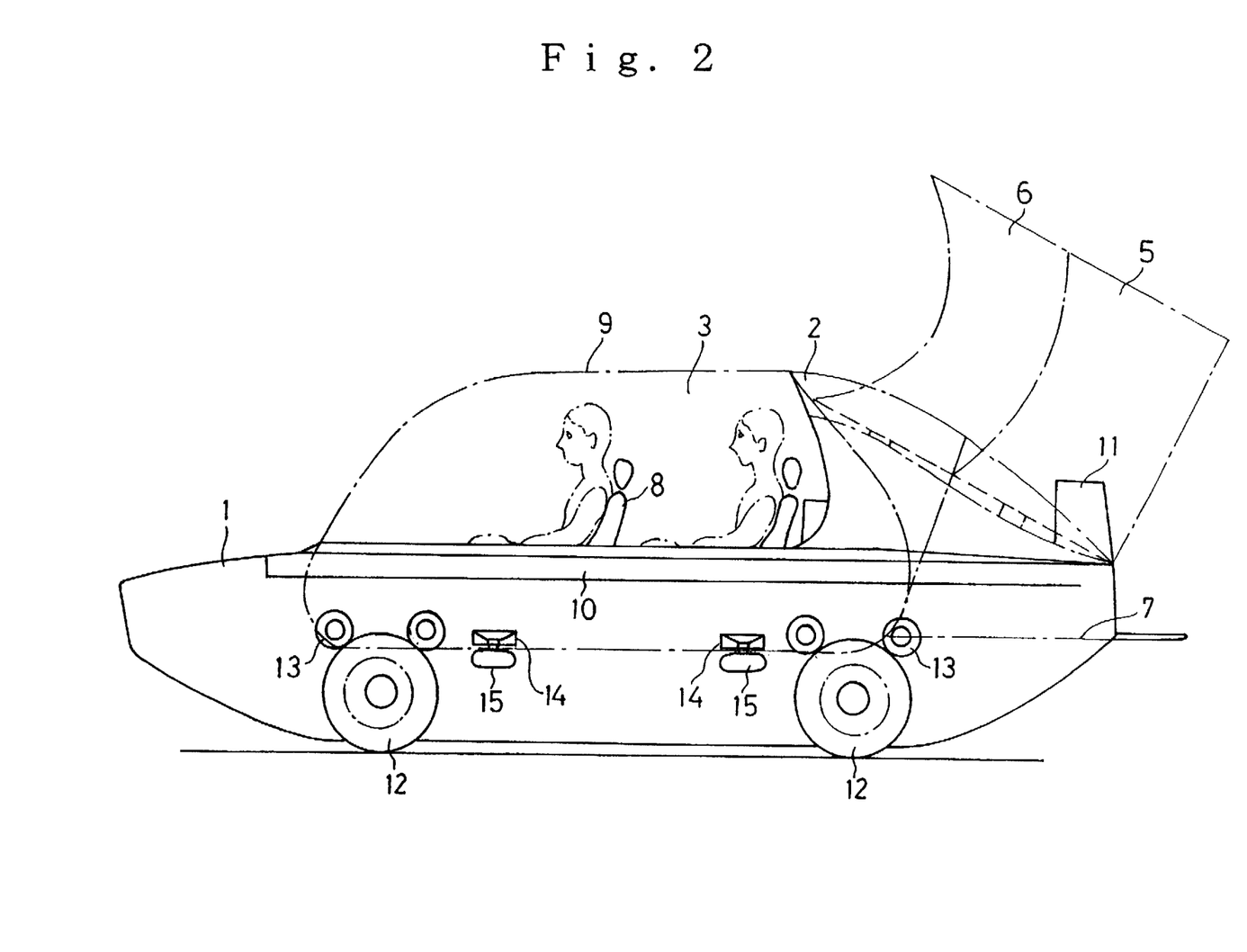
FIG. 2 is a side view of the underwater and land travel vehicle according to the present invention.
Figure 3:
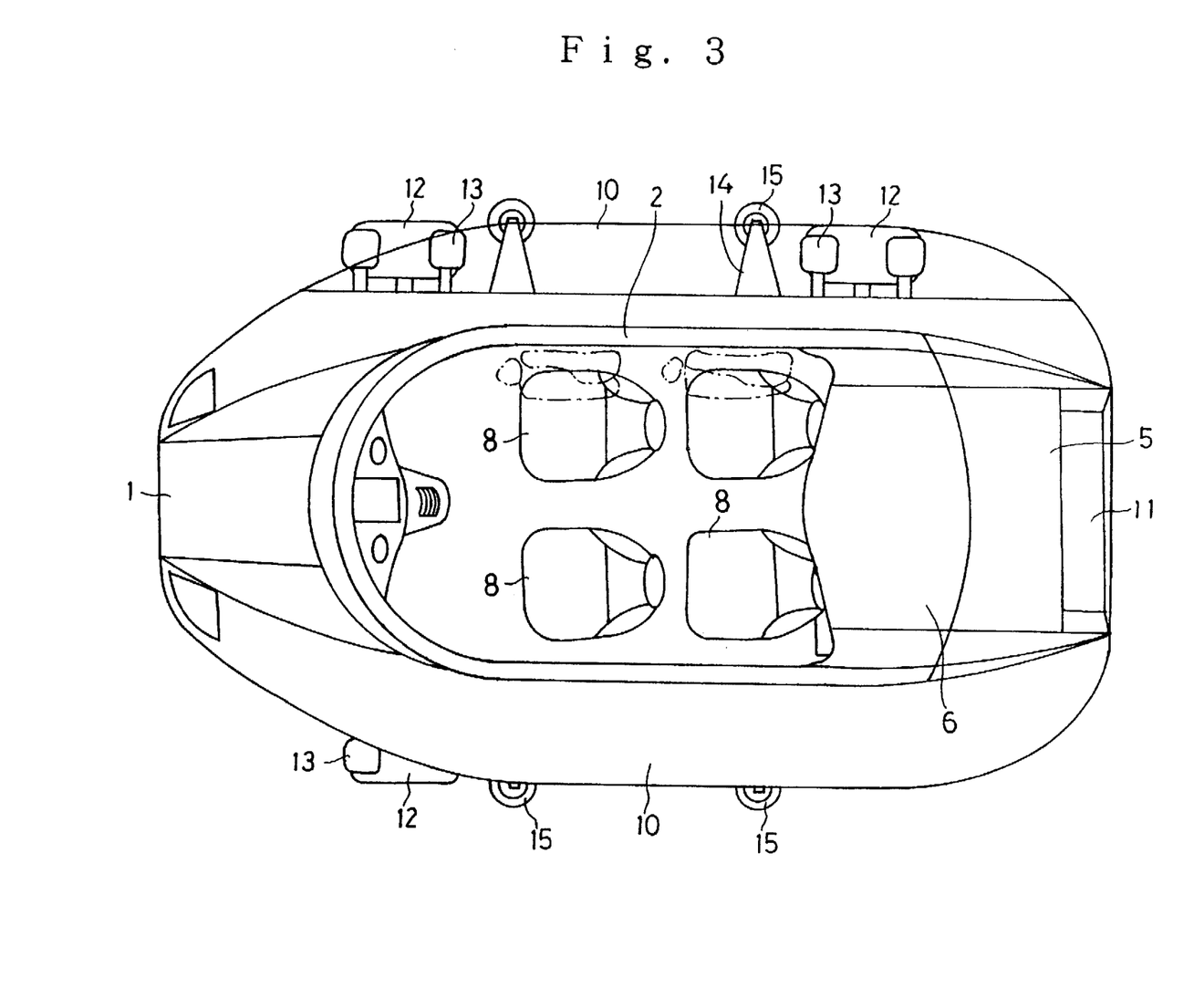
FIG. 3 is a plan view of the underwater and land travel vehicle according to the present invention.
Figure 4:
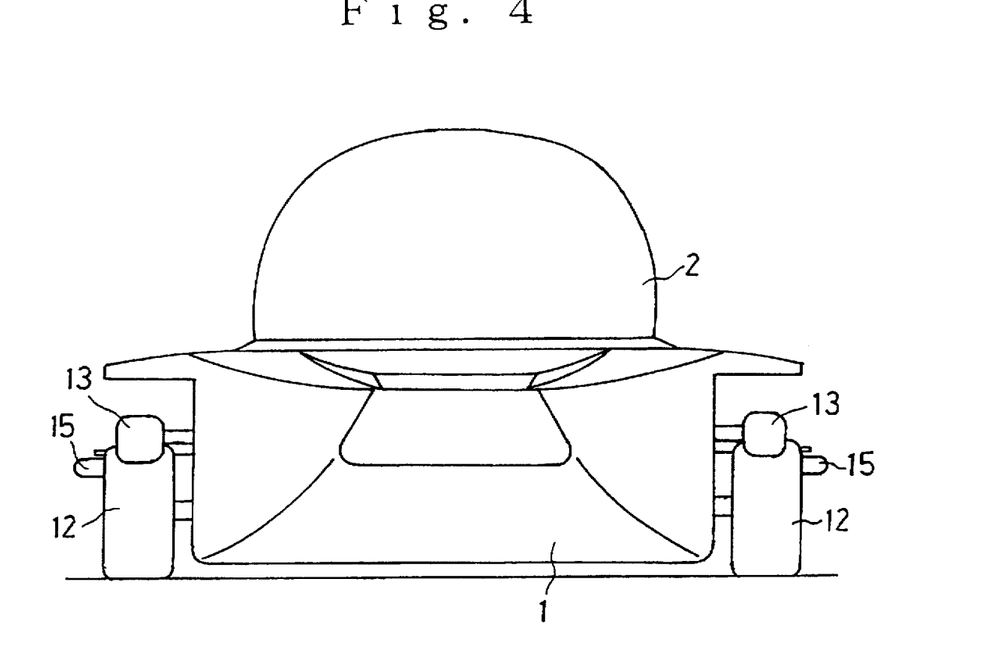
FIG. 4 is a front view of the underwater and land travel vehicle according to the present invention.
Figure 5:
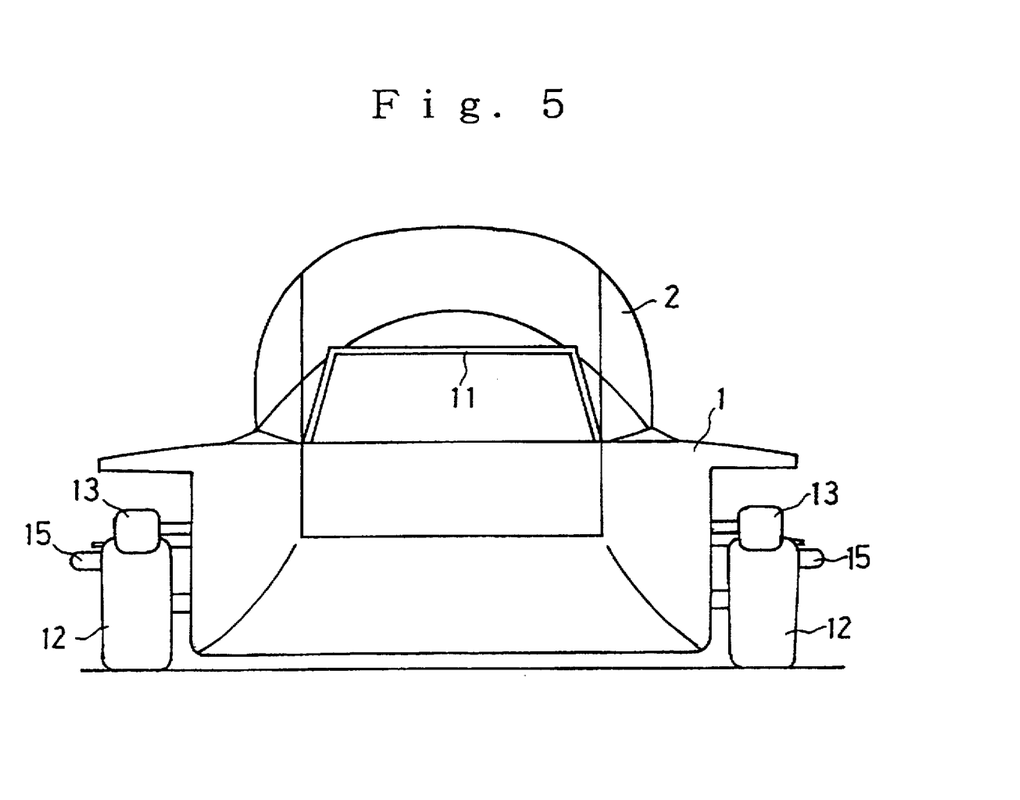
FIG. 5 is a rear view of the underwater and land travel vehicle according to the present invention.
Figure 6:
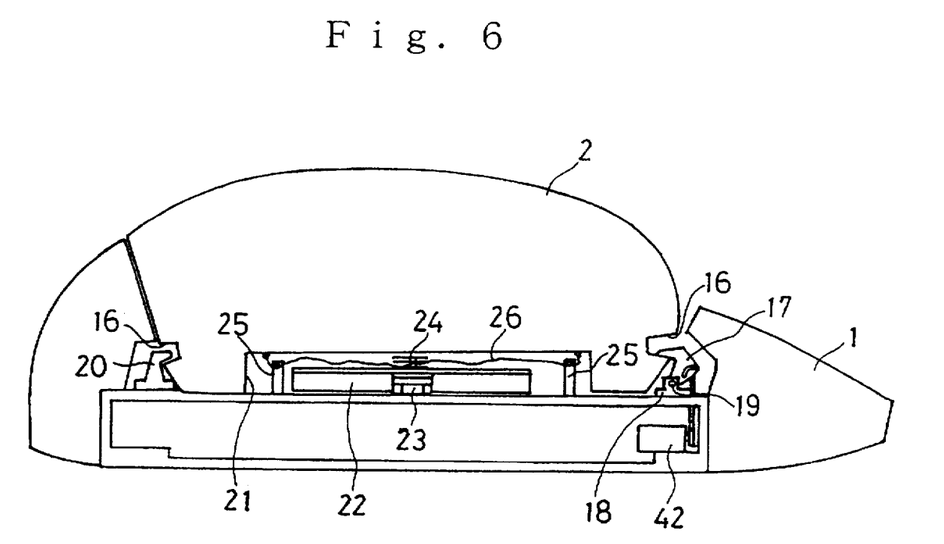
FIG. 6 is a vertical sectional view illustrating an emergency escaping device in an underwater and land travel vehicle according to the present invention.
Figure 7:
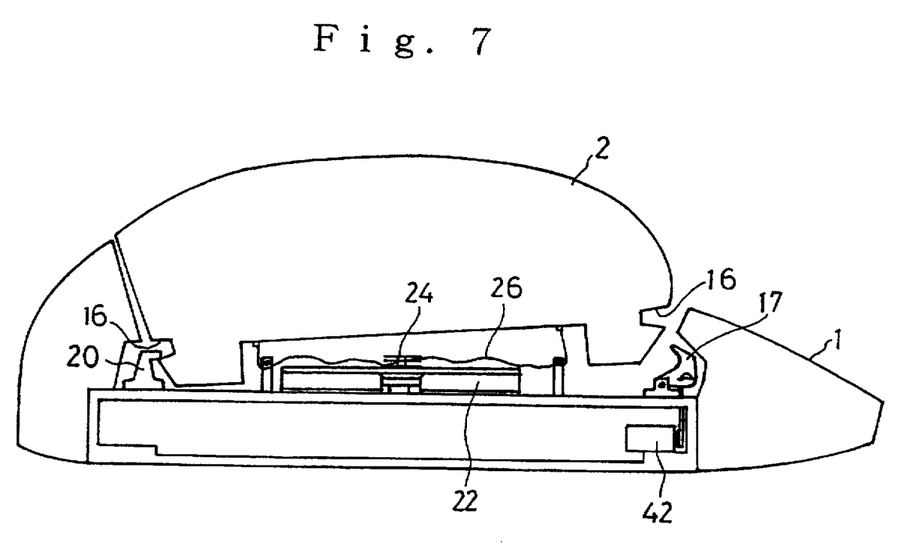
FIG. 7 is a view illustrating the emergency escaping device in the underwater and land travel vehicle in a state in which a movable hook has been released.
Figure 8:
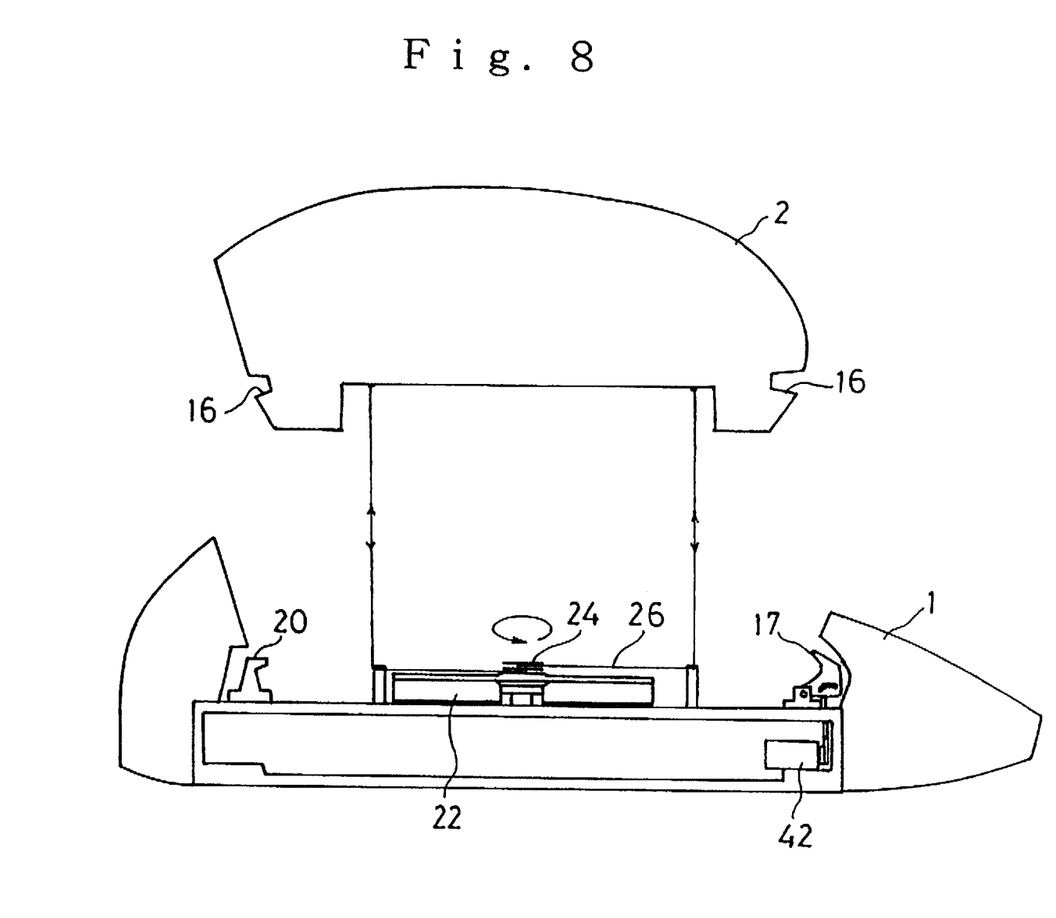
FIG. 8 is a view illustrating the emergency escaping device in the underwater and land travel vehicle in a state in which the vehicle capsule has been separated.

In the present embodiment, locking grooves 16, 16 as capsule retaining mechanisms are defined in front and rear portions of the vehicle capsule 2, as shown in FIGS. 6 to 8. The number of the locking grooves 16 may be one or more. A movable hook 17 is disposed for longitudinally swinging movement about a support pin 19 of a base 18 at a location in the vehicle body 1 corresponding to the front locking groove 16, and a stationary hook 20 capable of being locked in the locking groove 16 is disposed at a location in the vehicle body 1 corresponding to the rear locking groove 16. Thus, the vehicle capsule 2 can be separated from the vehicle body 1 by swinging the movable hook 17 to release the engagement of the movable hook 17 in the locking groove 16.

Further, a recess 21 is defined in a central portion of a lower surface of the vehicle capsule 2, and a fluid fin 22 is disposed on an upper surface of the vehicle body 1 at a location corresponding to the recess 21 for rotation about a rotary shaft 23. Furthermore, a rotary pulley 24 is coaxially mounted at an upper end of the rotary shaft 23 of the fluid fin 22, and wire guides 25 stand in the front and rear vicinities of the fluid fin 22 of the vehicle body 1. A wire 26 of a predetermined length is connected at front and rear locations on an inner surface of the recess 21 in the vehicle capsule 2. The wire 26 is wound in the same direction around the rotary pulley 24 through the wire guides 25.

Figure 9:
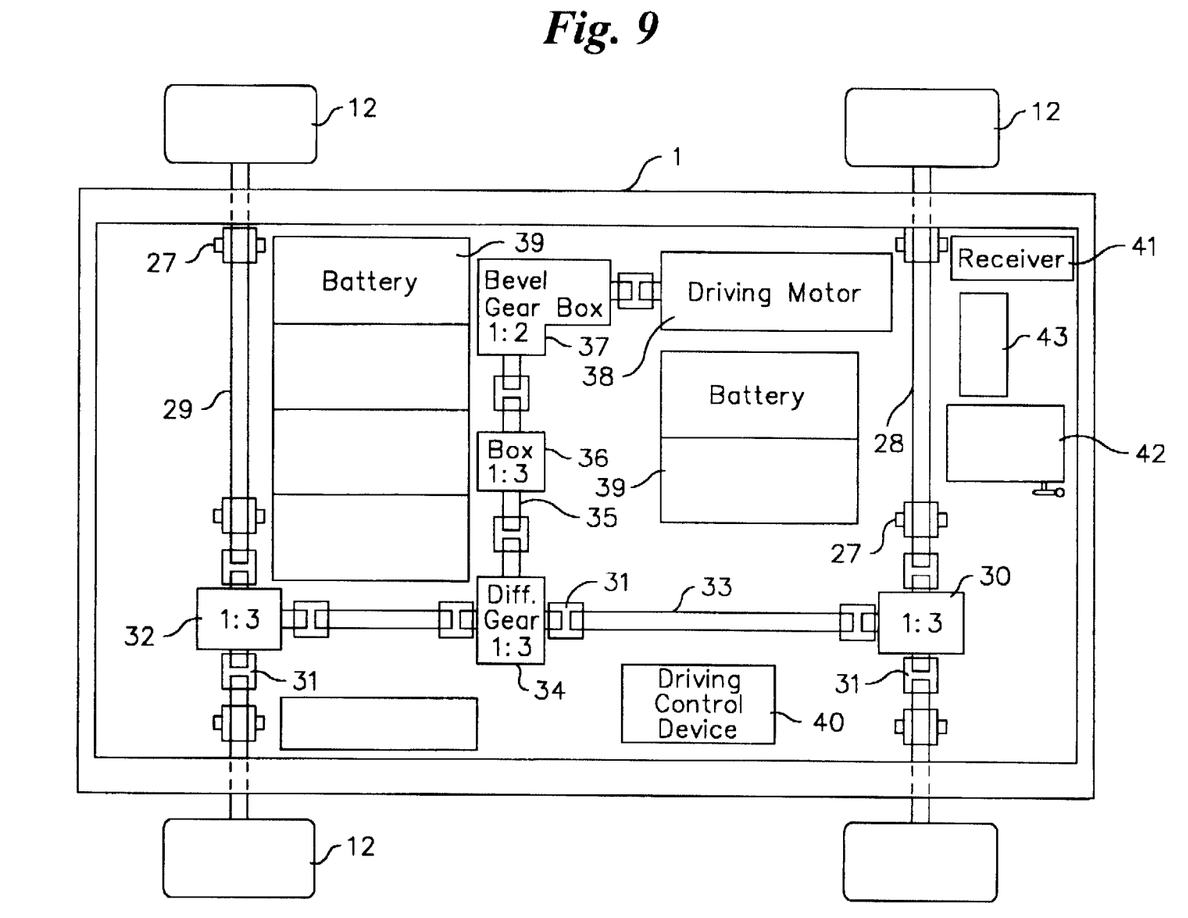
FIG. 9 is a diagrammatic illustration of the inside of the underwater and land travel vehicle according to the present invention.

A front driving shaft 28 having the front main tire 12 secured thereto and a rear driving shaft 29 having the rear main tire 12 secured thereto are disposed respectively at front and rear locations within the vehicle body 1 and rotatably supported through bearings 27. A differential gear 30 is disposed at a middle portion of the front driving shaft 28 through a coupling 31, while a rear differential gear 32 is disposed at a middle portion of the rear driving shaft 29 through a coupling 31. The differential gears 30 and 32 are connected to each other by a drive shaft 33, and a center differential gear 34 is disposed at a middle portion of the drive shaft 33 through a coupling 31. Further, a transmitting shaft 35 is connected to the center differential gear 34, and a gear box 36 is disposed at a middle portion of the transmitting shaft 35. A bevel gear box 37 is connected to the gear box 36 for changing the direction of the transmitting shaft 35 by 90 degrees, and an output shaft of a driving motor 38 is connected to the bevel gear box 37. Thus, the front and rear driving shafts 28 and 29 are rotated through the bevel gear box 37, the gear box 36, the center differential gear 34, the front differential gear 30 and the rear differential gear 32 by the rotative driving of the drive motor 38, whereby the main tires 12 can be driven in rotation. A plurality of batteries 39 for driving the drive motor 38 are disposed in a space in the travel driving mechanism within the vehicle body 1, and a drive control device 40 for controlling the driving of the drive motor 38 is also disposed in such space. In the present embodiment, the travel driving of the vehicle body 1 is automatically controlled by a remote control by radio and hence, a receiver 41 for receiving the radio is disposed within the vehicle body 1. Further, an actuator 42 for turning the movable hook 17 is disposed within the vehicle body 1, and an actuator battery 43 for operating the actuator 42 is also disposed within the vehicle body 1, so that the movable hook 17 is swung by the operating the actuator 42 to release the engagement of the movable hook 17 in the locking groove. The actuator 42 may be operated by a remote control as is the travel operation, or may be operated manually by the passenger or occupant in the compartment in the travel capsule 2.

In the present embodiment, a water injection port and a water discharge port (not shown) are provided at front and rear portions of the vehicle body 1, respectively. Thus, when the vehicle travels in the water, the vehicle is a bilged type vehicle in which water enters the inside of the vehicle body 1. To this end, the travel driving mechanism, the battery 28 and the like are subjected to a water-proofing treatment, so that they withstand the entering of water.

Figure 10:
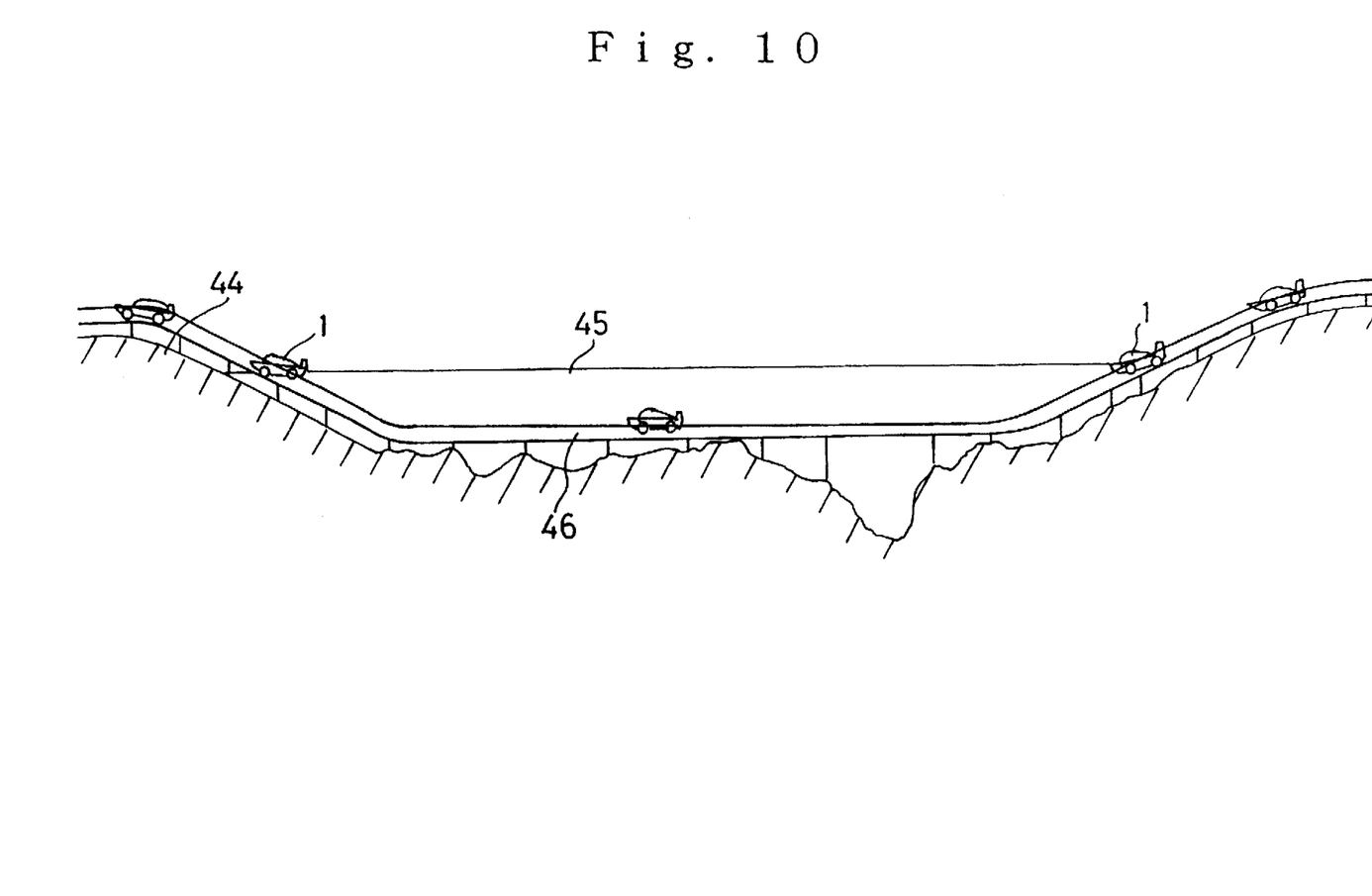
FIG. 10 is an illustration of a travel system for the underwater and land travel vehicle according to the present invention.

FIG. 10 shows one embodiment of a travel system for causing the traveling of the vehicle body 1 constructed in the above manner. For example, a travel rail 46 is laid to extend from the land through the water such as sea water. The single travel rail 46 may be laid so that the vehicle body 1 reciprocally travels on the travel rail 46, or the travel rail 46 may be laid in a loop fashion, so that the vehicle body 1 travels around on the rail 46.

Figure 11:
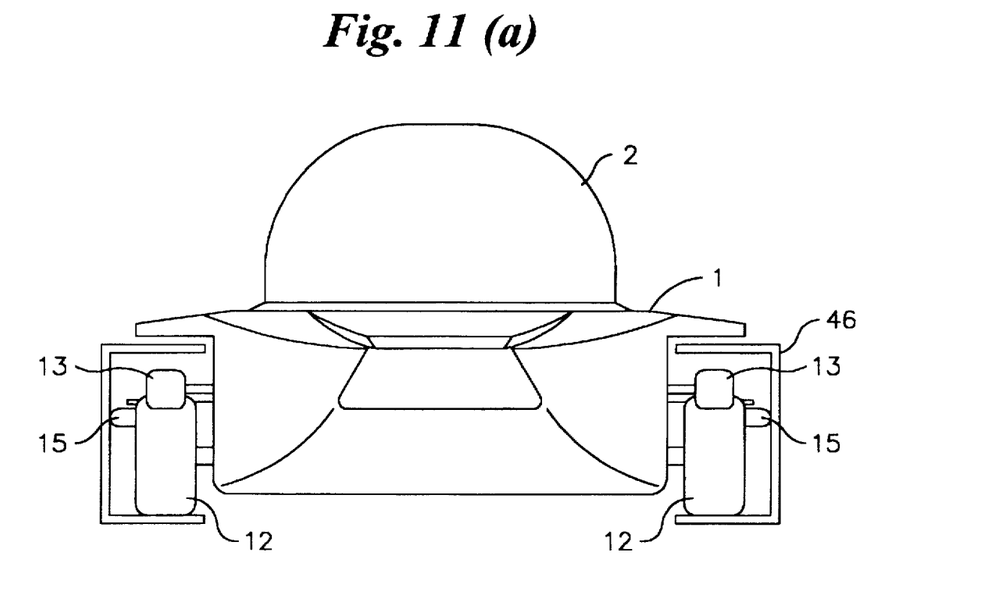
FIG. 11a is a view illustrating the vehicle during traveling of the vehicle on the land.
FIG. 11b is a view illustrating g the vehicle during traveling of the vehicle in the water.

Travel rails 46 may be C-shaped in section, as shown in FIG. 11, and may be laid parallel, so that their open end faces are opposed to each other. Thus, the vehicle body 1 is placed on the travel rails 46 by locating the main tires 12 and the auxiliary tires 13 inside the travel rails 46. In this state, the guide tires 15 abut against inner sides of the travel rails 46.

In this embodiment, the travel rails 46 are formed into the C-shape in section, but the travel rail 46 may have, for example, a shape which has at least an upper surface in the water 45 and at least a lower surface on the land 44. Further, on the land 44, the vehicle may travel on a road surface in place of on the travel rails 46.

Figure 12:
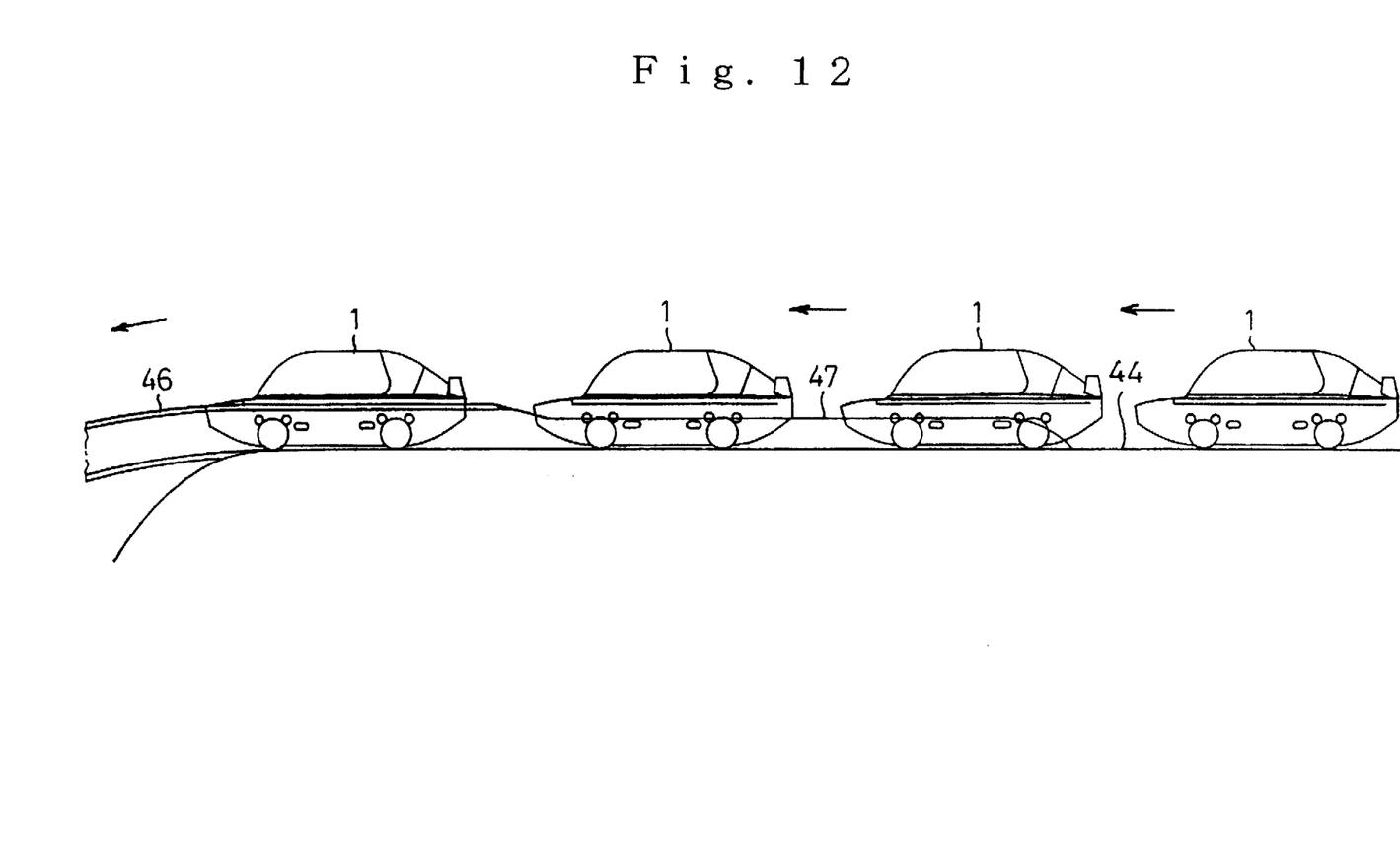
FIG. 12 is a side view illustrating the structure of a land portion in the travel system for the underwater and land travel vehicle according to the present invention.
Figure 13:
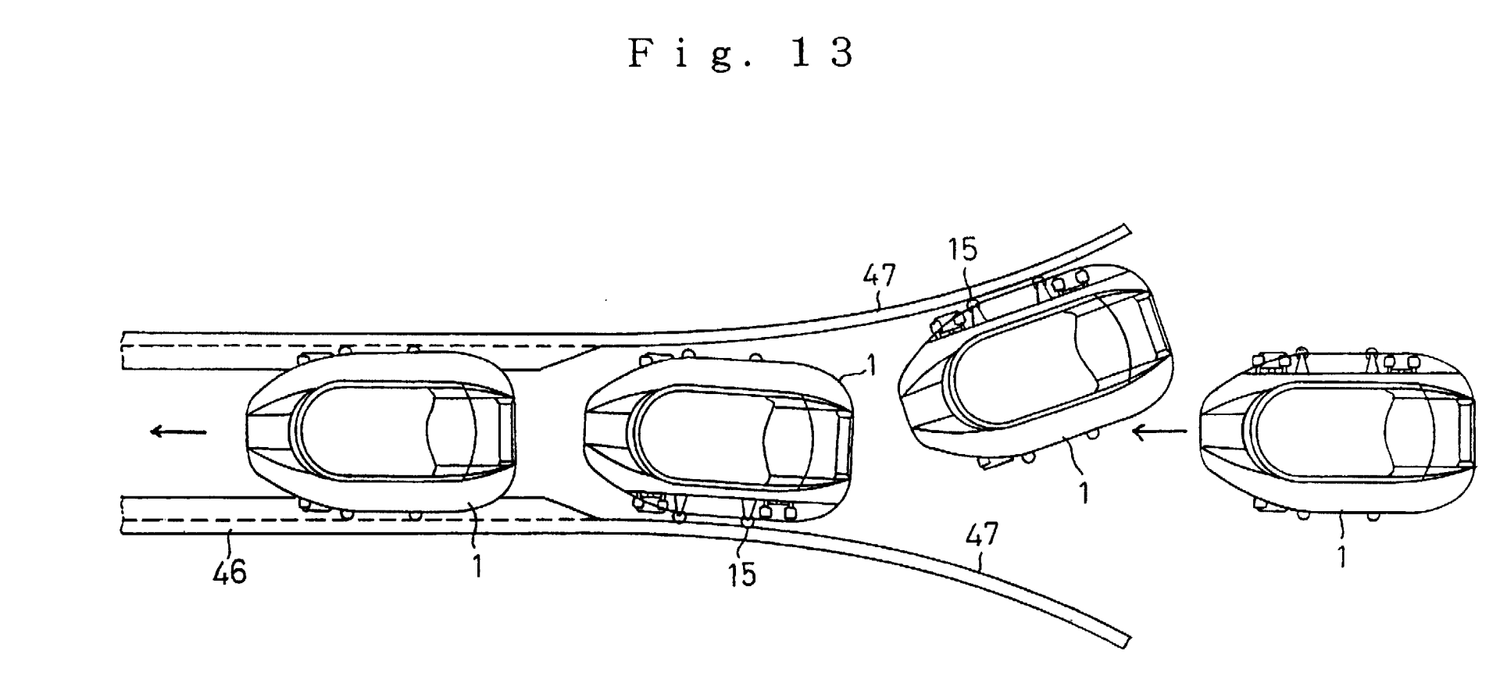
FIG. 13 is a plan view illustrating the structure of a land portion in the travel system for the underwater and land travel vehicle according to the present invention.
Figure 14:
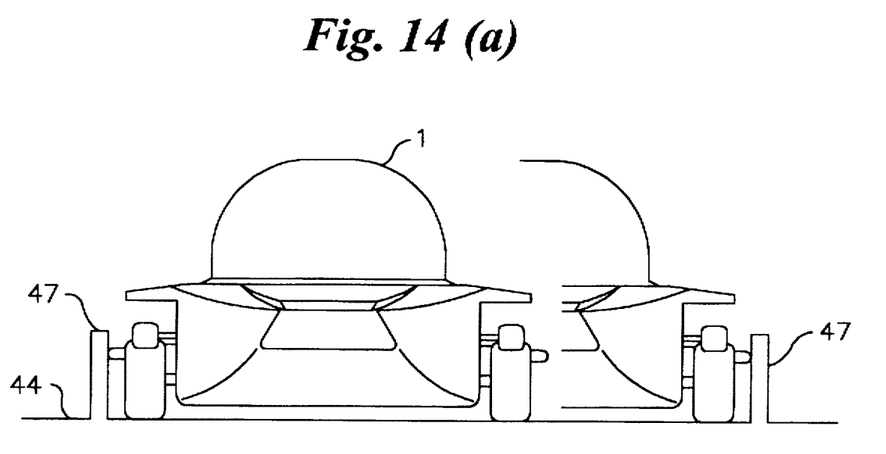
FIG. 14a is a view illustrating the vehicle traveling between guide walls.
FIG. 14b is a view illustrating the vehicle traveling on the travel rails.

In this embodiment, guide walls 47 are mounted in a rising manner so that they are contiguous to the ends of the travel rails 46, respectively, as shown in FIGS. 12 through 14. The ends of the guide walls 47 are formed so that they are spread into an arcuate shape.

The formation of the guide walls 47 in the above manner ensures that as a result of the travel vehicle body 1 traveling on a road surface on the land 44 being moved between the guide walls 47, the guide tires 15 of the vehicle body 1 abut against the inner sides of the guide walls 47, whereby the vehicle body 1 is guided along the inner sides of the guide walls 47 and thus necessarily located between the travel rails 46.

The operation of this embodiment will be described below.

In this embodiment, first, in the state in which the vehicle body 1 has been located on the land 44, the external hatches 5 and 6 of the vehicle body 1 and the vehicle capsule 2 are opened. And the passengers board on the vehicle. Then, the internal hatch 4 is closed, and the external hatches 5 and 6 are closed. This causes the insides of the vehicle capsule 2 and the passenger compartment to be maintained air-tight. In this case, an appropriate amount of oxygen is constantly supplied into the passenger compartment 3 by an oxygen generating device, and carbon dioxide generated within the compartment 3 is removed by a carbon dioxide removing device, although not being shown.

Then, by conducting the travel operation of the vehicle by the remote control by radio, a control signal is received by a receiver 41, whereby the driving of the drive motor 38 is controlled by the drive control device 40. Then, the front and rear driving shafts 28 and 29 are driven in rotation through the bevel gear box 37, the gear box 36, the center differential gear 34, the front differential gear 30 and the rear differential gear 32 by the rotative driving of the drive motor 38, whereby the main tires 12 are driven in rotation to cause the travel vehicle body 1 to travel.

Then, the travel vehicle body 1 traveling on the road surface on the land 44 is moved between the guide walls 47, whereby the guide tires 15 of the vehicle body 1 abut against the inner sides of the guide walls 47. This ensures that the vehicle body 1 is guided along the inner sides of the guide walls 47 and located between the travel rails 46 and caused to travel along the travel rails 46 by the rotative driving of the main tires 12.

In this case, the force of gravity is applied to the travel vehicle body 1 on the land and hence, the main tires 12 abut against the inner lower surfaces of the travel rails 46, as shown in FIG. 11a, so that the vehicle is moved along the travel rails 46 by the rotative driving of the main tires 12.

When the vehicle body 1 has been moved along the travel rails 46 and submerged into the water 4, water is allowed to enter into the vehicle body 1 through the water inlet port, so that the vehicle body 1 floats inside the travel rails 46 under influence of the buoyancy of the vehicle body 1 and the buoyancy of air in the compartment 3. As a result, the main tires 12 are spaced apart from the inner lower surface of the travel rails 46 to abut against the inner upper surface of the travel rails 46, as shown in FIG. 11b. In this case, the auxiliary tires 13 are rotated in a direction opposite from the direction of rotation of the main tires 12, because they are in contact with the main tires 12. Thus, the direction of rotation of the main tires 12 is maintained intact, and the travel vehicle body 1 is moved in the water 45 along the inner upper surfaces of the travel rails 46 by the auxiliary tires 13.

When the vehicle body 1 has been moved from in the water into the air along the travel rails 46, the buoyancy is lost, and the force of gravity is applied. Thus, the vehicle body 1 to be lowered, causing the main tires 12 to abut against the inner lower surfaces of the travel rails 46, so that the vehicle is moved along the travel rails 46 by the rotative driving of the main tires 12.

If any trouble is developed during traveling of the vehicle body 1 in the water, then the actuator 42 is operated by the remote control or the driver's operation to swing the movable hook 17, thereby releasing the engagement of the movable hook 17 in the locking groove 16, as shown in FIG. 7. This causes the front portion of the vehicle capsule 2 to be tilted to float under influence of the buoyancy of the vehicle capsule 2. The tilting of the vehicle capsule 2 causes the engagement of the stationary hook 20 in the locking groove 16 to be also released and as a result, the travel capsule 2 is separated from the vehicle body 1. In this case, the vehicle capsule 2 is connected to the vehicle body 1 through the wire 26. Thus, the application of a tension to the wire 26 with the floating of the vehicle capsule 2 causes the wire 26 to be drawn out, so that the rotary pulley 24 is rotated by the wire 26. This allows the fluid fin 22 to be drive in rotation, so that the drawing of the wire 26 is limited by the resistance to the rotation of the fluid fin 22 in the water 22, thereby limiting the floating speed of the vehicle capsule 2.

In the state in which the vehicle capsule 2 has floated onto the water, the rescue is waited. In this case, by leaving the vehicle capsule 2 and the vehicle body 1 connected to each other by an electric wire in addition to the wire 26, for example, the control of the radio and the oxygen supply can be continued in the rescue waiting state. By mounting a self-traveling device such as a simple screw on the vehicle capsule 2, the wire 26 can be cut after floating of the vehicle capsule 2 onto the water, so that the vehicle capsule 2 can be moved onto the land by itself through the self-traveling device. Further, wings may be disposed in a retractable manner on opposite sides of the vehicle capsule 2, so that the floating speed of the vehicle capsule 2 can be controlled by spreading of the wings in floating of the vehicle capsule 2.

Therefore, in the present embodiment, the auxiliary tires 13 are disposed on the upper portions of the main tires 12 on the vehicle body 1 to abut against the main tires 12, and when the vehicle travels on the land 44, the main tires 12 are brought into abutment against the inner lower surfaces of the travel rails 46 by the rotative driving of the main tires 12, and when the vehicle travels in the water 45, the auxiliary tires 13 rotated in the opposite direction from the direction of rotation of the main tires 12 are brought into abutment against the inner upper surfaces of the travel rails 46 under influence of the buoyancy of the vehicle body 1. Therefore, it is possible to allow the vehicle body 1 to travel on the land 44 and in the water 45 by rotating the main tires 12 in one direction without changing the direction of rotation of the main tires 12.

In addition, since the guide walls 47 formed to spread at their ends into the arcuate shape are mounted contiguously to the ends of the travel rails located on the land 44, the vehicle body 1 traveling on the road surface on the land can be guided along the inner sides of the guide walls 47 and necessarily located between the travel rails 46.

Further, if any trouble is developed during traveling of the vehicle body 1 in the water, the vehicle capsule 2 can be separated from the vehicle body 1 by releasing the engagement of the movable hook 17 in the locking groove 16. Moreover, since the drawing-out of the wire 26 for connecting the vehicle capsule 2 and the vehicle body 1 is limited by the fluid fin 22, the floating speed of the vehicle capsule 2 can be limited and as a result, the vehicle capsule 2 with the passenger or occupants therein can be floated at an appropriate speed, and can be also floated safely without application of a shock to the passenger or occupants.

Figure 15:
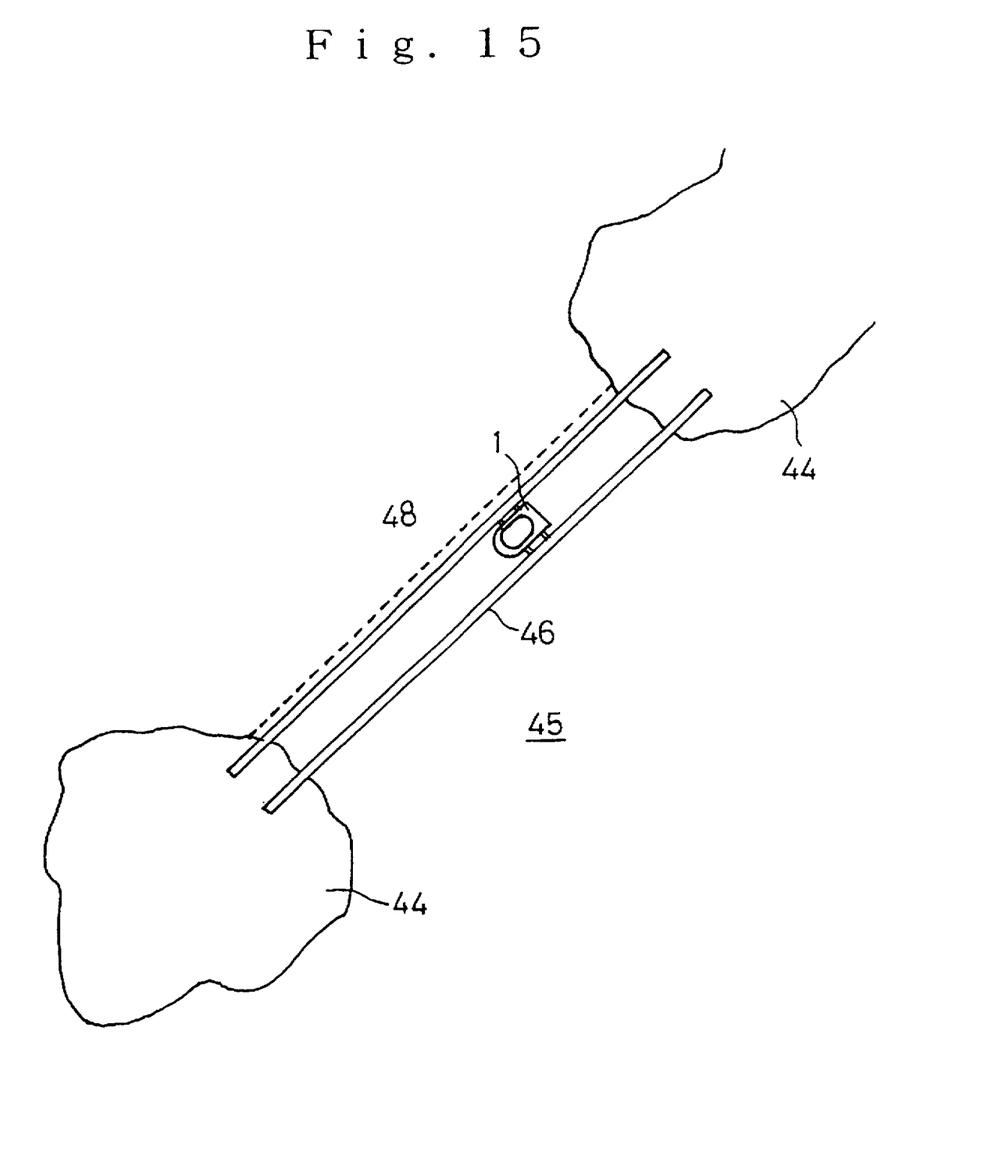
FIG. 15 is an illustration of another travel system for the underwater and land travel vehicle according to the present invention.

FIG. 15 shows another application of a travel system for permitting a vehicle body 1 to travel. A travel rail 46 can be laid, for example, along an object 48 installed in the sea such as a wire including an electric wire and a telephone cable or a pipeline for petroleum which has been previously installed between the main island and an isolated island.

Thus, the travel vehicle body 1 can be utilized as a traffic means between the main island and the isolated island by allowing the vehicle body 1 to travel along the travel rail 46.

In this case, the travel vehicle body 1 can be utilized as a cargo transporting vehicle by removing the seats in the passenger compartment in the vehicle body 1 and utilizing the passenger compartment as a cargo compartment. In such case, the window is not required and hence, the upper portion of the vehicle capsule 2 may be formed from a material similar to the material for the vehicle body 1 or the vehicle capsule 2.

Further, a plurality of the travel vehicles 1 for passengers and a plurality of the travel vehicles 1 utilized as the cargo transporting vehicles can be connected together for traveling.

If the travel rail 46 is laid along the object installed in the sea such as the electric wire, the pipeline and the like, as described above, it is possible to reliably perform the inspection and the like of the electric wire, the pipeline and the like for inspection by the passenger on the. vehicle. If a single or a plurality of video cameras are mounted on the vehicle body 1, so that the position and direction of the video camera can be adjusted as desired and so that a picture image provided by the video camera can be transmitted by radio and viewed at a remote control position, it is possible to reliably perform the inspection and the like of the object 48 installed in the sea such as the electric wire, the pipeline and the like.

It will be understood that the present invention is not limited to the above-described embodiments, and various modifications may be made. For example, the present invention is applicable to a vehicle utilized in an amusement park, a pleasure park and the like, or a vehicle used for viewing the sight in the water 45 in an aquarium and the like. Further, the present invention is applicable to a vehicle toy which travels in the water in a cistern in a room or in the water in a pond outside of a room.

INDUSTRIAL APPLICABILITY

As discussed above, the underwater and land travel vehicle according to the present invention can be allowed to continuously travel in the water and on the land by driving the vehicle to travel along the travel rail. Therefore, for example, the travel vehicle can be utilized as traffic means for human or cargo between the main island and the isolated island, or utilized for inspection of the object installed in the sea such as the electric wire for telephone or the pipeline for petroleum. Further, the travel vehicle can be utilized as a vehicle utilized in an amusement park, a pleasure park and the like, or a vehicle used for viewing the sight in the water in an aquarium and the like. Further, the present invention is applicable to a vehicle toy which travels in the water in a cistern in a room or in the water in a pond outside of a room.

We claim:

1. An underwater and land travel vehicle comprising a bilged type vehicle body formed for movement along a pair of travel rails which are laid to extend from on the land into the water and which each have an upper surface and a lower surface, wherein said vehicle further includes main tires which are located between the upper and lower surfaces of said travel rails, so that they abut against the lower surfaces of said travel rails during traveling of said vehicle on the land, and auxiliary tires each of which is disposed on an upper portion of one of of said main tires to abut against said main tire, so that they abut against the upper surfaces of said travel rails under influence of the buoyancy of said vehicle body during traveling of the vehicle in the water.

2. An underwater and land travel vehicle according to claim 1, wherein said travel vehicle may include a vehicle capsule placed on said vehicle body.

3. An underwater and land travel vehicle according to claim 2, wherein said vehicle capsule includes a passenger compartment defined therein for getting-in of passengers.

4. An underwater and land travel vehicle according to claim 2, wherein said vehicle capsule includes a cargo compartment defined therein for loading of loads.

5. An underwater and land travel vehicle according to claim 1, further including guide walls mounted at ends of the travel rails located on the land, so that they are contiguous to said ends, said guide walls being formed so as to be spread at their ends into an arcuate shape.

6. An underwater and land travel vehicle comprising a bilged type vehicle body formed for movement along a pair of travel rails which are laid to extend from on the land into the water and which each have an upper and a lower surface, wherein said vehicle further includes main tires which are located between the upper and lower surfaces of said travel rails, so that they abut against the lower surfaces of said travel rails during traveling of said vehicle on the land, and auxiliary tires each of which is disposed on an upper portion of one of said main tires to abut against said main tire, so that they abut against the upper surfaces of said travel rails under influence of the buoyancy of said vehicle body during traveling of the vehicle in the water, said vehicle body having a travel capsule placed on an upper portion thereof so that in case of emergency, said vehicle capsule can be separated from said vehicle body, wherein said travel vehicle includes a capsule retaining mechanism adapted to usually retain said vehicle capsule and said travel vehicle body in an integral state and to release said retaining in case of emergency, said vehicle body and said vehicle capsule being connected to each other by a wire, and a resistance applying means disposed in said vehicle body for limiting the amount of wire drawn out.

7. An underwater and land travel vehicle according to claim 6, wherein said resistance applying means is a fluid fin, and said wire is wound around a rotary pulley which is mounted on a rotary shaft of said fluid fin.

8. An underwater and land travel vehicle comprising a bilged type vehicle body formed for movement along a pair of travel rails which are laid to extend from on the land into the water and which each have an upper surface and a lower surface, wherein said vehicle further includes main tires which are located between the upper and lower surfaces of said travel rails, so that they abut against the lower surfaces of said travel rails during traveling of said vehicle on the land, and auxiliary tires each of which is disposed on an upper portion of each of said main tires so that they abut against the upper surfaces of said travel rails under influence of the buoyancy of said vehicle body during traveling of the vehicle in the water.

9. An underwater and land travel vehicle according to claim 8, wherein said auxiliary tires are driven to rotate in a direction opposite to the direction of rotation of the main tires.

* * * * *